United States Patent [19]

Kaminsky et al.

[11] Patent Number: 4,849,487
[45] Date of Patent: Jul. 18, 1989

[54] 1-OLEFIN STEREOBLOCK POLYMER, AND A PROCESS FOR ITS PREPARATION

[75] Inventors: Walter Kaminsky, Pinneberg; Maria Buschermöhle, Hamburg, both of Fed. Rep. of Germany

[73] Assignee: Hoechst Aktiengesellschaft, Frankfurt am Main, Fed. Rep. of Germany

[21] Appl. No.: 125,559

[22] Filed: Nov. 25, 1987

[30] Foreign Application Priority Data

Nov. 29, 1986 [DE] Fed. Rep. of Germany ....... 3640924

[51] Int. Cl.$^4$ .......................... C08F 4/64; C08F 10/06
[52] U.S. Cl. ..................................... 526/160; 502/103; 526/351
[58] Field of Search ........... 526/160, 351, 348.2–348.6

[56] References Cited

U.S. PATENT DOCUMENTS

| 3,472,829 | 10/1969 | Claybaugh et al. | 526/905 |
| 4,499,247 | 2/1985 | Chiba et al. | 526/905 |
| 4,522,982 | 6/1985 | Ewen | 526/160 |
| 4,530,914 | 7/1985 | Ewen et al. | 526/160 |
| 4,542,199 | 9/1985 | Kaminsky et al. | 526/160 |
| 4,769,510 | 9/1988 | Kaminsky et al. | 526/160 |

FOREIGN PATENT DOCUMENTS 0128045 12/1984 European Pat. Off. .
185918 7/1986 European Pat. Off. .

Primary Examiner—Edward J. Smith

[57] ABSTRACT

Stereoblock polymers of 1-olefins having a broad uni-, bi-, tri- or multimodal molecular weight distribution are obtained when a catalyst which comprises a chiral metallocene containing bridges and an alumoxane is used for the polymerization of the 1-olefins. The polymers are particularly highly suitable for the production of transparent films.

3 Claims, 1 Drawing Sheet

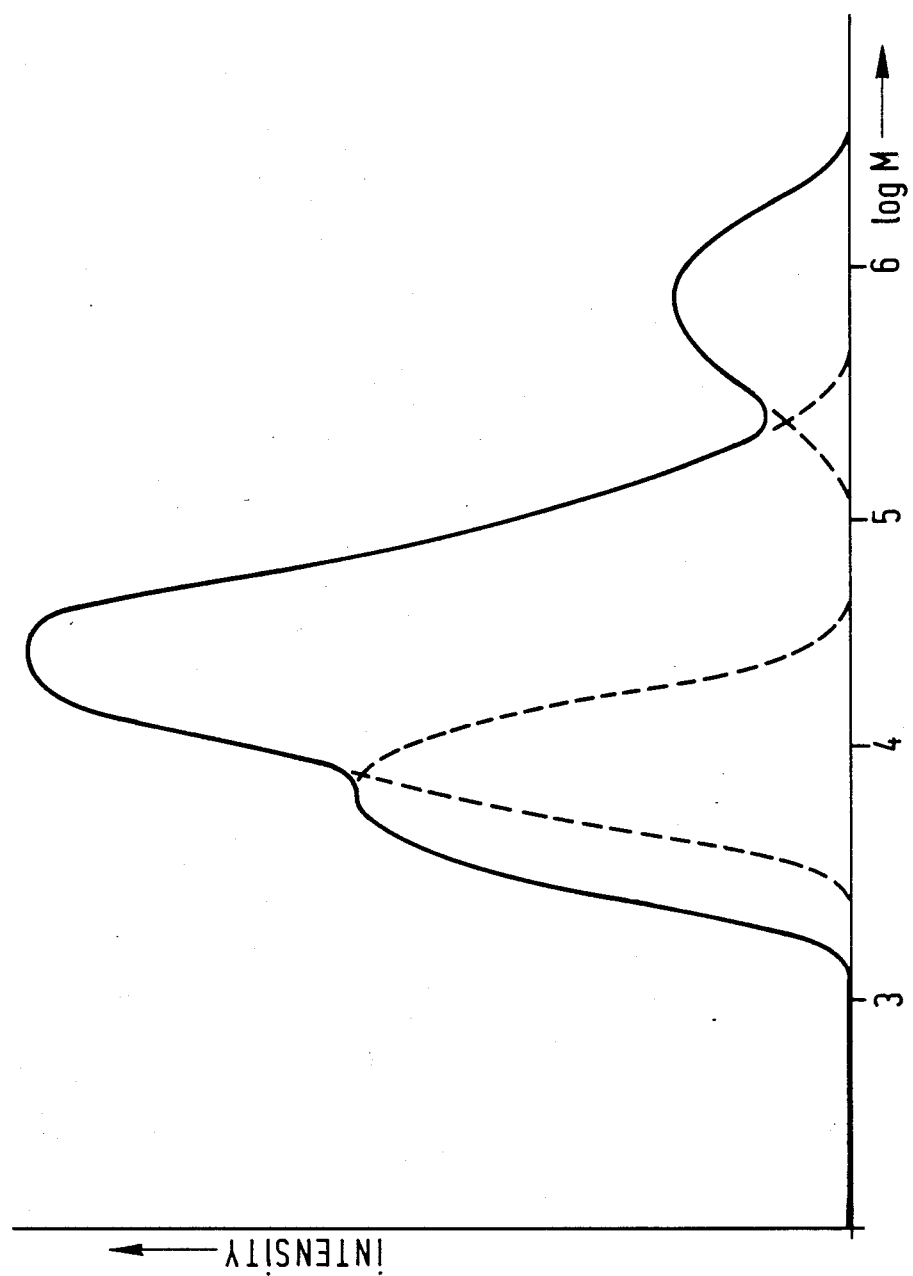

1-OLEFIN STEREOBLOCK POLYMER, AND A PROCESS FOR ITS PREPARATION

DESCRIPTION

The invention relates to a stereoblock polymer having long isotactic sequences, and to a process for its preparation.

It is known that exclusively atactic polymer is obtained when a catalyst based on bis-cyclopentadienyl compounds of zirconium and aluminoxane is used in the polymerization of propylene (cf. EP-A 69,951).

In addition, highly isotactic polypropylene can be prepared using soluble, stereorigid, chiral zirconium compounds (cf. EP-A 185,918).

This polypropylene has a very narrow molecular weight distribution of $M_w/M_n=2$.

A process is furthermore known for the preparation of polypropylene which has a blocklike structure and in which the isotactic sequences are 2 to 17 monomer units long (cf. U.S. Pat. No. 4,522,982). The catalyst employed is a metallocene of a metal of group 4b, 5b or 6b of the periodic table, for example titanium, vanadium or hafnium, in particular titanium. This metallocene is a mono-, di- or tricyclopentadienyl or substituted cyclopentadienyl metal compound. The cocatalyst used is an aluminoxane. The polypropylenes obtained having a blocklike structure likewise have a very narrow molecular weight distribution ($M_w/M_n=2$).

Finally, it is known that simultaneous polymerization using two or more metallocene catalyst systems gives polyethylene having a bimodal molecular weight distribution ($M_w/M_n$ up to 7.8) (cf. EP-A 128,045). However, so-called reactor blends are obtained in this process and no homogeneous polymer produced by means of a catalyst system.

In addition, the purely achiral catalysts published in the publication mentioned give atactic polypropylene in the polymerization of propylene.

The object was therefore to find a uniform catalyst system which produces a stereoblock polymer having a broad molecular weight distribution. Such a polymer promises higher homogeneity, which is the basis for better mechanical properties (e.g. freedom from specks in the case of films, increased toughness).

It has now been found that the object can be achieved when the catalyst used is a metallocene which contains bridges between the pentahapto-bound cyclopentadienyl rings, and an alumoxane.

The invention thus relates to the stereoblock polymer described in the claims and to the process for its preparation.

The stereoblock polymer according to the invention is a polymer of a 1-olefin of the formula R-CH=CH$_2$ in which R denotes an alkyl radical having 1 to 28 carbon atoms, preferably 1 to 10 carbon atoms, in particular one carbon atom, for example propylene, 1-butene, 1-hexene, 4-methyl-1-pentene, or 1-octene. In particular, the polymer is a propylene polymer. Its molecular chains comprise alternating isotactic sequences with an opposed configuration and a length of three or more monomer units. In addition, the polymer has a broad molecular weight distribution which is uni-, bi-, tri- or multimodal, preferably bi-, tri- or multimodal, in particular bi- or trimodal.

The figure shows a typical gel-permeation chromatogram (GPC) of a stereoblock polymer according to the invention having a $M_w/M_n$ value of 14.9.

The catalyst to be used for the process according to the invention comprises a metallocene compound of the formula I and an alumoxane. In the formula I

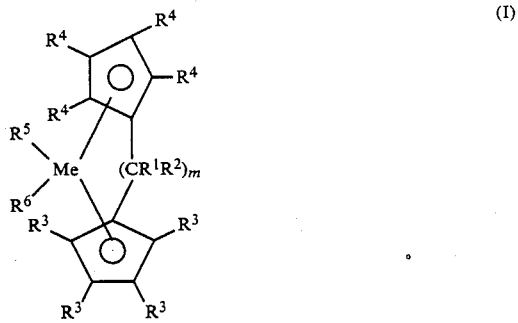

Me is a metal of group IVb, Vb or VIb of the periodic table, for example titanium, zirconium, hafnium, vanadium, chromium, molybdenum or tungsten, preferably titanium.

$R^1$ and $R^2$ are identical or different and denote $C_1$- to $C_{10}$-alkyl, $C_6$- to $C_{10}$-aryl, $C_2$- to $C_{10}$-alkenyl or $C_7$ to $C_{40}$-arylalkyl, preferably ethyl or methyl, in particular methyl.

$R^3$ and $R^4$ are identical or different and denote a hydrogen atom or a methyl group, preferably a hydrogen atom. $R^5$ and $R^6$ are likewise identical or different and denote a halogen atom, such as chlorine, bromine or iodine, $C_1$- to $C_{10}$-alkyl, $C_6$- to $C_{10}$-aryl, $C_2$- to $C_{10}$-alkenyl, $C_7$- to $C_{40}$-arylalkyl or $C_8$- to $C_{40}$-arylalkenyl, preferably methyl or chlorine, in particular chlorine. m is 2, 3 or 4, preferably 2.

The metallocene compound which is particularly preferably employed is tetramethylethylene-bis(cyclopentadienyl)titanium dichloride. This type of compound can be prepared, for example, by reductive coupling of 6,6-dimethylfulvene with sodium amalgam, sodium anthracenide or magnesium metal/CCl$_4$ as reducing agent with subsequent reaction of the anionic tetramethyldicyclopentadienylethane compound with TiCl$_3$ or ZrCl$_4$.

The second component of the catalyst according to the invention is an alumoxane of the formula II

for the linear type and/or of the formula III

for the cyclic type. In these formulae, $R^7$ denotes methyl, ethyl or isobutyl, preferably methyl, and n denotes an integer from 4 to 20, preferably 10 to 16.

The alumoxane can be prepared in various ways.

One possibility is to carefully add water to a dilute solution of a trialkylaluminum, by introducing the solution of the trialkylaluminum and the water, in each case in small portions, into an initially introduced, relatively large amount of an inert solvent, and in each case waiting between additions for the end of gas evolution.

In a further process, finely powdered copper sulfate pentahydrate is slurried in toluene, and, in a glass flask under an inert gas, sufficient trialkylaluminum is added at about −20° C. so that about one mole of CuSO$_4$.5-H$_2$O is available per 4 Al atoms. After slow hydrolysis with alkane elimination, the reaction mixture is left at room temperature for 24 to 48 hours, cooling possibly being necessary to prevent the temperature increasing to above 30° C. The copper sulfate is subsequently filtered off from the alumoxane, dissolved in toluene, and the toluene is removed by distillation in vacuo. It is presumed that the low- molecular-weight alumoxanes condense in this process to form higher oligomers with elimination of trialkyl aluminum.

Finally, alumoxanes are obtained when trialkylaluminum, dissolved in an inert aliphatic or aromatic solvent, is reacted at a temperature of −20° to 100° C. with aluminum salts, preferably aluminum sulfate, containing water of crystallization.

In this reaction, the volume ratio between the solvents and the alkyl aluminum used is 1:1 to 50:1—preferably 5:1—and the reaction time, which can be checked by means of the alkane elimination, is 1 to 200 hours - preferably 10 to 40 hours.

Of the aluminum salts containing water of crystallization, those are preferably used which have a high content of water of crystallization. Aluminum sulfate hydrate, above all the compounds Al$_2$(SO$_4$)$_3$.18H$_2$O and Al$_2$(SO$_4$)$_3$.16H$_2$O having the particularly high content of water of crystallization of 16 or 18 moles of H$_2$O/mole of Al$_2$(SO$_4$)$_3$ respectively, is particularly preferred.

The catalyst to be used according to the invention is employed for the polymerization of 1-olefins of the formula R-CH=CH$_2$ as mentioned above.

The polymerization is carried out in a known fashion in solution, in suspension or in the gas phase, continuously or batchwise, in one or several stages, at a temperature of −60° to 100° C., preferably −20° to 80° C. The pressure is 0.5 to 60 bar. Polymerization in the pressure range 5 to 60 bar, which is particularly interesting industrially, is preferred.

In this process, the metallocene compound is used in a concentration, relative to titanium or zirconium, of 10$^{-3}$ to 10$^{-6}$, preferably 10$^{-4}$ to 10$^{-5}$ mole of Ti or Zr respectively per liter of solvent or per liter of the reactor volume. The alumoxane is used in a concentration of 10$^{-4}$ to 10$^{-1}$ mole, preferably 10$^{-3}$ to 10$^{-2}$ mole, per liter of solvent or per liter of the reactor volume. However, higher concentrations are also possible in principle.

The polymerization is carried out in an inert solvent which is customary for the Ziegler low-pressure process, for example, in an aliphatic or cycloaliphatic hydrocarbon; butane, pentane, hexane, heptane, isooctane, cyclohexane and methylcyclohexane may be mentioned as examples of such hydrocarbons. It is furthermore possible to use a petroleum or hydrogenated diesel oil fraction which has been carefully freed from oxygen, sulfur compounds and moisture. Toluene can also be used. Finally, the monomers to be polymerized can also be employed as solvents or suspending agents. The molecular weight of the polymer can be regulated in a known fashion; hydrogen is preferably used for this purpose.

EXAMPLE 1

A dry, argon-filled gas autoclave was filled at −60° C. with 250 ml of dry toluene, 300 mg of methylalumoxane having a degree of oligomerization of n = 16, and 45 g of propylene. 2×10$^{-5}$ mol of tetramethylethylene-bis(cyclopentadienyl)titanium chloride was added to this solution.

After a polymerization time of 42 hours, 9.6 g of rubber-like polypropylene was obtained. The activity was 11.4 kg of PP/mol of Ti.h, and the viscosimetrically determined molecular weight average was M$_{eta}$=190,000.

The isotactic sequence length was 5.2; M$_w$/M$_n$=14.9.

EXAMPLE 2

The polymerization was carried out as in Example 1, but at a temperature of −40° C. The polymerization time was 47 hours, yield 9 g of PP. Activity 9.6 kg/mmol of Ti.h, M$_w$/M$_n$=15.0, isotactic sequence length 4.3. M$_{eta}$=170,000.

EXAMPLE 3

The polymerization was carried out as in Example 2, but at a temperature of −20° C. The polymerization time was 66 hours, yield 8.6 g of PP. Activity 6.5 kg/mmol of Ti.h, M$_w$/M$_n$=12.9, isotactic sequence length; 4.2. M$_{eta}$=160,000.

We claim:

1. A process for the preparation of a 1-olefin stereoblock polymer through polymerization of a 1-olefin of the formula R-CH=CH$_2$ in which R is an alkyl group having 1 to 28 carbon atoms, at a temperature of −60° to 100° C., at a pressure of 0.5 to 60 bar, in solution, in suspension or in the gas phase, in the presence of a catalyst which comprises metallocene compound and an alumoxane, the metallocene compound being tetramethylethylene-bis(cyclopentadienyl)-titanium dichloride, and
    the alumoxane being a compound of the formula II $$Al_2OR_4{}^7-[-Al(R^7)-O-]_n- \qquad (II)$$

for the linear type or of the formula (III)

$$-[-Al(R^7)-O-]_{n+2}$$

for the cyclic type, or combinations thereof, and where, in the formulae II and III, R$^7$ denotes methyl, ethyl, or isobutyl, and n is an integer from 4 to 20.

2. A process as claimed in claim 1, wherein the 1-olefin is propylene.

3. A process as claimed in claim 1, wherein the catalyst consists essentially of said metallocene and said alumoxane.

* * * * *